J. C. KILGORE.
Boiler-Tube Attachments.
No. 151,402.  Patented May 26, 1874.
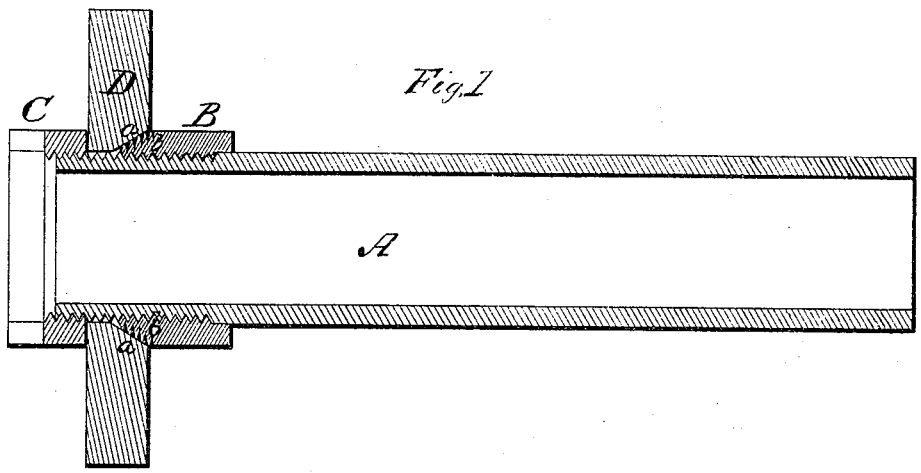
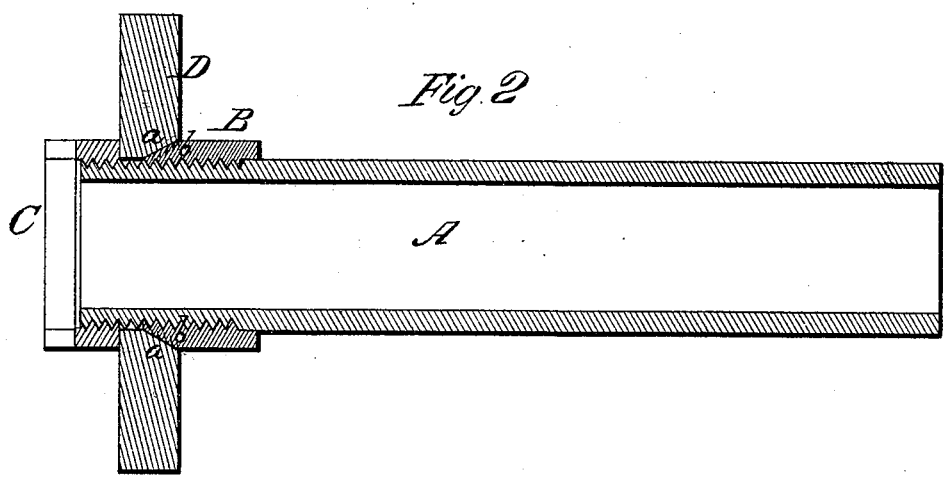
WITNESSES  
Villette Anderson.  
George E. Upham.
INVENTOR  
John C. Kilgore,  
By Chipman, Hosmer & Co.
ATTORNEYS.

UNITED STATES PATENT OFFICE.

JOHN C. KILGORE, OF SHARPSBURG, PENNSYLVANIA, ASSIGNOR TO THE ECLIPSE STEAM MANUFACTURING COMPANY, OF SAME PLACE.

IMPROVEMENT IN BOILER-TUBE ATTACHMENTS.

Specification forming part of Letters Patent No. 151,402, dated May 26, 1874; application filed April 18, 1874.

*To all whom it may concern:*

Be it known that I, JOHN C. KILGORE, of Sharpsburg, in the county of Allegheny and State of Pennsylvania, have invented a new and valuable Improvement in Boiler-Tube Attachments; and I do hereby declare that the following is a full, clear, and exact description of the construction and operation of the same, reference being had to the annexed drawings making a part of this specification, and to the letters and figures of reference marked thereon.

The figures of the drawings are representations of sectional views of my device.

This invention has relation to couplings or "unions" for pipes used in all kinds of steam-fitting; and consists in an annular, serrated, and beveled collar, suitably applied on a pipe, in combination with a smooth annular, beveled, and concave surface formed in the plate or part to which it is desired to apply the pipe, whereby a tightly-fitting joint can be made at a comparatively small cost.

In the construction of steam-boilers, and in "steam-fitting" generally, it has been found very difficult to make pipe-connections or unions which would stand the influence of fire and unequal expansion without leaking at the joints. I have overcome this difficulty by a very simple and cheaply-made joint, which I will now proceed to describe.

In the annexed drawings, I have represented my improvements applied to a pipe, A, which is connected to a boiler-plate, D; but in carrying the improvement into effect, I contemplate its application to pipe-connections of various kinds. The pipe A has a screw-thread cut on one end, on which is tightly screwed a collar, B. One end of this collar is beveled, and a number of V-shaped grooves are made in this beveled surface, so as to form their annular ridges or feathers *b*. The hole through the plate D is surrounded by a bevel surface, *a*, which is ground true and smooth, its bevel corresponding to the bevel on the collar B. Where the end of the pipe A is passed through the boiler-plate D, a tubular nut, C, is applied on the screw-threaded portion and forcibly screwed up. This brings the annular feathered portion of the collar in contact with the beveled surface *a*, and when a proper force is applied to the nut C the feathers or ribs *b* will yield and snugly accommodate themselves to the surface *a*. By this means a tight joint is secured, and one which will not be liable to leak when exposed to fire. By reason of the feathers *b* seating themselves, or, in other words, finding their own seats, the beveled surfaces need not be formed with that accuracy which would be necessary if one of the beveled surfaces was not feathered, as described.

It is obvious that the same advantages would result from having the feathers on the beveled surface *a* instead of on surface *b*.

What I claim, and desire to secure by Letters Patent, is—

In a pipe-joint, the combination of two beveled surfaces, *a b*, one of which is feathered, substantially as described.

In testimony that I claim the above I have hereunto subscribed my name in the presence of two witnesses.

JOHN C. KILGORE.

Witnesses:
GEORGE E. UPHAM,
ROBERT EVERETT.